Figure 1:
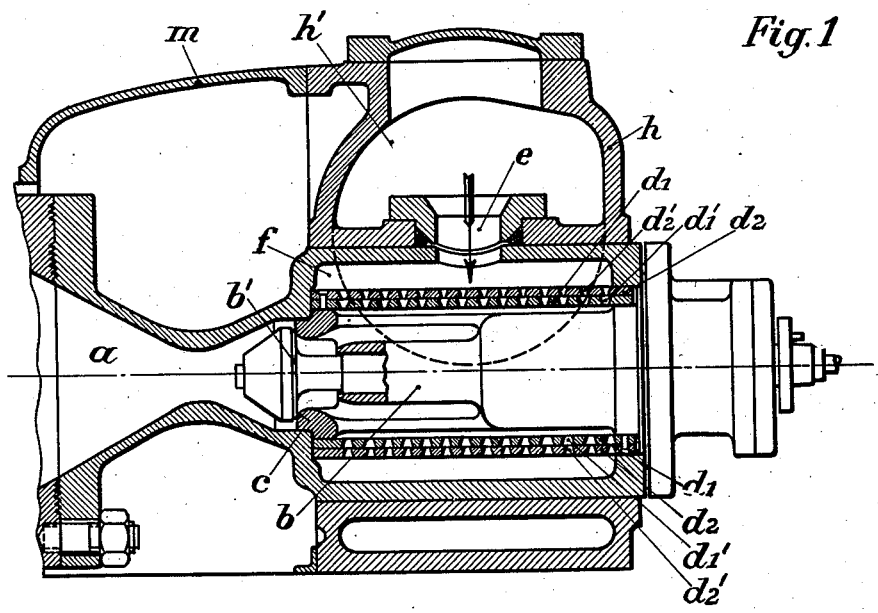

Inventor:
Hans Holzwarth

April 5, 1932.  H. HOLZWARTH  1,852,164

PRESSURE DAMPING MECHANISM

Filed Jan. 28, 1929  2 Sheets-Sheet 2

Inventor:
Hans Holzwarth

Patented Apr. 5, 1932

1,852,164

UNITED STATES PATENT OFFICE

HANS HOLZWARTH, OF DUSSELDORF, GERMANY, ASSIGNOR TO HOLZWARTH GAS TURBINE CO., OF SAN FRANCISCO, CALIFORNIA, A CORPORATION OF DELAWARE

PRESSURE DAMPING MECHANISM

Application filed January 28, 1929, Serial No. 335,695, and in Germany February 10, 1928.

My invention relates to pressure damping mechanism for avoiding or reducing the dangerous effects, in passageways conveying operating media, such as air or fuel, or mixtures thereof, to a combustion chamber, of premature ignition or explosion in such chamber occurring before the inlet valve has completely closed.

It has already been proposed in connection with internal combustion piston engines to protect those parts of the gas conduits which are exposed to sudden high pressures because of premature explosion in the engine cylinder or because of failure of the inlet valve to close completely before the explosion, and are incapable of withstanding such high pressures, by means of one or more check-valves located in such conduits. This known measure could be applied to the gas passages of an explosion turbine and particularly to those which conduct charging air or fuel and air mixtures, including coal dust and air mixtures, to the combustion chambers of such turbines, but its use is objectionable because of the fact that check-valves possess the disadvantage that they are comparatively slow acting, and, further, because their operation depends upon the movement of a number of individual parts, such valves do not afford complete security.

The present invention has for its object to avoid these disadvantages which are particularly undesirable in connection with explosion turbines, and accomplishes the same by the insertion of nozzles in the gas passageway or conduit which nozzles decrease in cross-section in the direction of normal flow of the gases. These nozzles possess no appreciable resistance to the normal flow of the gases through the conduit to the valve and combustion chamber. When, however, the direction of flow of the gases is reversed, as occurs for example when the gases are exploded in the combustion chamber while the valve is still open, these nozzles effect so considerable a contraction in the path available for the gas, particularly when such nozzles are formed with sharp edges, that they exert a strong hindering, damping or braking action upon such stream of gas. This damping action is the stronger the greater the velocity of the gas stream rushing into the conduit. My invention contemplates also the production of a still greater damping action by the arrangement of a plurality of such nozzles in series in the direction of normal gas flow. In such case the spaces enclosed between the nozzles form damping chambers, as these spaces are much wider than the nozzle outlets which bound them. As the pressure energy of the gases is converted into velocity or flow energy there occurs in such damping chambers a more or less complete destruction of such energy through whirling, i. e. the energy is rendered ineffective to exert any considerable pressure in the gas conduit. The nozzles may be made to abut against each other and may be connected at their contiguous walls, in which case the nozzles lie along the same axis in the direction of gas flow so that the enlarged ends of the nozzles themselves form braking or damping chambers. To avoid any material increase in the resistance to the normal flow of gases through the conduits a number of such nozzles may be arranged alongside of each other, i. e. in parallel, but the invention is not restricted to such arrangement of a plurality of nozzles. The nozzles may, for instance, be located in the walls of a box or casing or in the walls of a plurality of such boxes or casings which are concentrically arranged or nested one within the other. Such box or boxes may be so arranged as to surround the inlet valve for the combustion chamber and thus form a sort of cage thereabout; such an arrangement is extremely compact.

As indicated above, a number of damping stages or chambers may be formed by arranging a plurality of nozzles one behind the other in the direction of flow. There may be arranged in addition a check member or valve of any suitable kind in advance of the nozzle or nozzles. A check-valve positioned at such point offers the advantage that the portion of the gas conduit in advance of the same is completely shut off upon operation of such valve; such construction does not involve the disadvantage that the damping of the pressure waves is completely dependent upon such valve. The portion of the gas conduit lying in advance of the nozzles is located in the turbine housing and is preferably of circular or approximately circular cross-section so as to be as highly pressure-resistant as possible. Whenever it is inexpedient to construct this portion of the conduit of circular cross-section, the construction may be such that the gas conduit outside of the turbine housing is composed of a separate wrought iron tube and the connection between such tube and the place of use may be composed of short tubular conduits. This arrangement offers the advantage that the gas conduits may be made of such cross-section as to render them highly pressure-proof without in any way disturbing the details of design which may be more strongly dictated by other considerations.

Figure 2:
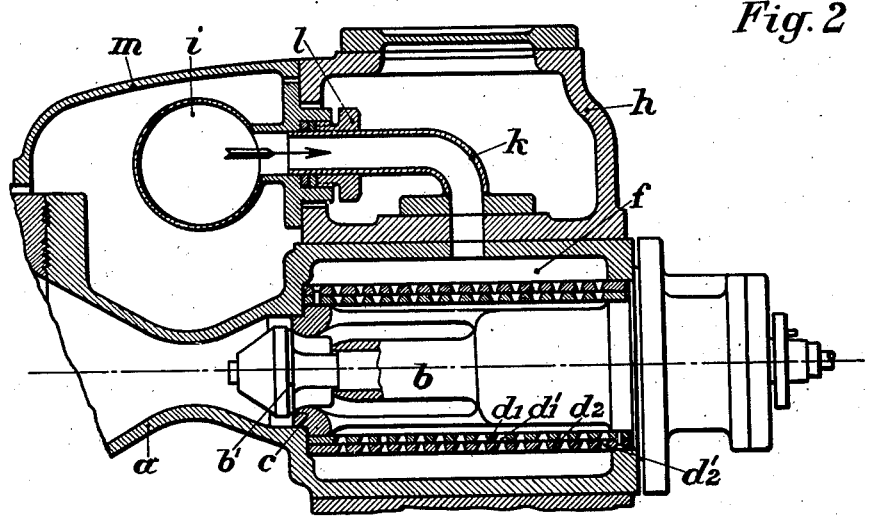
Figure 3:
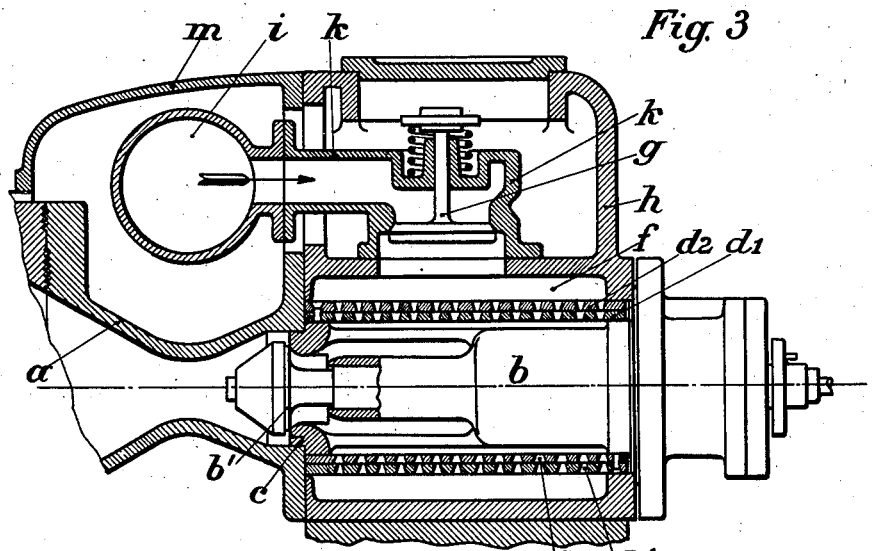
Figure 4:
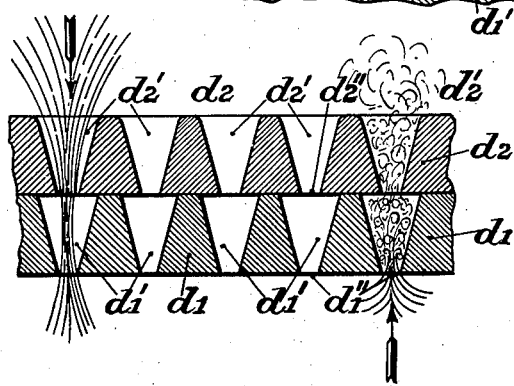
Figure 5:
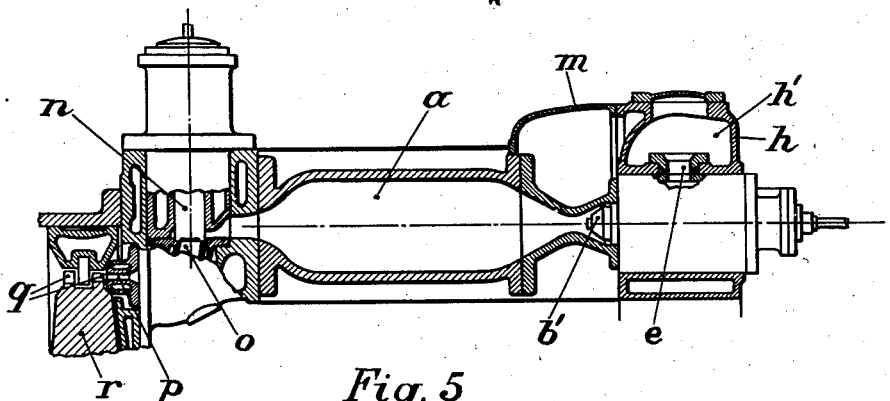

In the accompanying drawings which illustrate by way of example several embodiments of my invention without defining its limits, Fig. 1 is a vertical section through the air valve and the air conduit controlled thereby; Fig. 2 is a view similar to Fig. 1 but shows the air conduit replaced by tubes of small diameters; Fig. 3 is a view similar to Fig. 2 but includes a check-valve within the air tube; Fig. 4 is an enlarged view of the nozzles and nozzle chambers; and Fig. 5 is a partial section through the entire plant illustrating the general arrangement of parts.

In the several figures the letter $a$ designates one of the combustion chambers of an explosion turbine to which air is introduced by means of a charging valve $b$ which may be operated by oil under pressure in a manner well known in the art. The valve is positioned within a casing $f$ to which air is charged through an opening $e$ communicating with a gas passageway $h'$ (Fig. 1) within the housing $h$. In the closed position of the valve the space in advance of the same is shut off from the interior of the combustion chamber $a$ by the engagement of the valve head $b'$ with its seat $c$. In the normal operation of the valve the same is completely closed at or before the beginning of the explosion in the combustion chamber. For various reasons it may, however, occur that the valve head $b'$ is not completely seated against its seat $b$ at the beginning of the explosion, so that the gases under ignition or explosion pressure are projected into the space in advance of the valve. Such escape of gases under explosion pressure into the air passages leading to the air valve may occur, for example, as a result of premature ignition of the charge in the combustion chamber. In order to avoid or reduce the harmful effects of the escape of high pressure gas into the conduit leading to the valve, particularly in those portions of the conduit which are not adapted to withstand the pressure wave accompanying the escape of such gases, the conduit is so constructed as to oppose a very high resistance to the passage of gas therethrough in a direction opposite to the normal flow of gases.

In the preferred form of the invention the valve body $b$ is surrounded by a cage-like member composed of a plurality of hollow members or sleeves $d1$, $d2$ which are nested concentrically one within the other. A plurality of nozzles $d1'$, $d2'$ are provided in the walls of the sleeves, the cross-section of the nozzles decreasing in the direction of normal air flow (i. e. toward the valve). The nozzles $d2'$ are preferably in axial alignment with the nozzles $d1'$.

Fig. 4 shows the construction of the nozzles on an enlarged scale. It will be seen from the left half of this figure that gases flowing through the nozzles in the normal direction suffer no serious resistance, particularly when the sum of the minimum cross-sections of the nozzles is made equal to the cross-section of the conduit $e$ leading to the valve casing $f$. On the other hand, as indicated at the right half of Fig. 4, a surge of gas through the open valve $b$ from the combustion chamber into the gas conduit in a direction opposite to the normal gas flow through such conduit encounters a considerable braking or damping action. The reason for this action is that the sharp edges $d1''$ of the nozzles $d1'$ produce a sudden and large contraction in the area of the path available for the escaping explosion gases. The comparatively small amount of explosion gas which enters the chamber of the nozzle $d1''$ at high velocity impinges against and is reflected from the opposing walls of the sleeve $d2$, thereby producing whirling which more or less destroys the velocity energy of the gas which has penetrated into such chamber. That portion of the velocity energy of the gas in the chambers of nozzles $d1'$ which has not been destroyed or rendered ineffective is re-converted into pressure energy by expansion in such nozzle chambers, the pressure energy being again converted into velocity energy upon entry of the gases into the nozzle chambers $d2'$. The sharp edges $d2''$ of the nozzles located in the sleeve $d2$ cause a further contraction in the area of the path of the escaping explosion gases so that the amount of energy converted into pressure energy remaining in the gases in the chambers $d2'$ is so small that it is no longer sufficient to produce any harmful effects in the gas conduit.

If these final effects are still too powerful, because of the employment of very high explosion pressures, to be withstood by the section of the gas conduit in advance of the sleeves $d1$, $d2$, the same may be weakened by inserting, for example, any known form of check device such as a check-valve $g$ (Fig. 3).

Those portions of the air conduit which are located in the housing $h$ may be constructed as shown in Fig. 1 of approximately circular cross-section so that they are made sufficiently pressure-proof against the highly dampened pressure wave which has passed through the damping device $d1$, $d2$, $d1'$, $d2'$, $d1''$, and $d2''$ described above. If such circular formation should be inexpedient in certain situations, or should there be any obstructions which prevent the use of conduits of this form, then the construction shown in Fig. 2 may be employed in which the air conduit is composed of a wrought iron tube $i$ which is connected with the valve casing $f$ by means of the short tubular sections $k$ only one of which is shown in the drawings. Stuffing boxes $l$ of any known form may be employed to prevent leakage of gas from the conduits $k$. As shown in Figs. 2 and 3, a casing $m$ may be employed to enclose the air conduit $i$.

Fig. 5 shows a partial view of an explosion turbine plant in which the above described safety devices are incorporated. The explosion gases generated in the chamber $a$ pass in the well-known manner through the nozzle valve $n$ and channel $o$ to the nozzle $p$ by which they are directed against the blades $q$ of the rotor $r$.

While I have described my invention in connection with an air charging valve and with the conduits connected therewith for conducting air thereto, it will be understood that my invention is applicable to conduits which conduct any operating medium such as air, gas, mixtures of air and gas, mixtures of air and powdered coal, etc. to a charging valve. Variations may be resorted to within the scope of the appended claims without departing from the spirit of the invention.

I claim:

1. A dampening device adapted to be arranged in advance of the inlet of a combustion chamber, comprising a conduit, and a plurality of nozzles disposed side by side in said conduit and diminishing in cross-section in the direction of normal flow of a fluid through said conduit, said nozzles being sharp-edged at their reduced outlet ends.

2. A dampening device adapted to be located in advance of the inlet of a combustion chamber and comprising a conduit, and a plurality of nozzles disposed side by side in said conduit and other nozzles disposed side by side and in series with said first-mentioned nozzles, each nozzle diminishing in cross-section in the direction of normal flow of a fluid through said conduit and being sharp-edged at its reduced outlet end.

3. The combination set forth in claim 2 wherein the reduced outlet ends of one group of nozzles arranged side by side open towards the enlarged inlet ends of the other group of nozzles.

4. A dampening device adapted to be located in advance of the inlet of a combustion chamber and comprising a conduit, and a hollow member positioned in said conduit and provided in its walls with a plurality of nozzles arranged side by side and decreasing in cross-section in the direction of normal flow of a fluid through the conduit, said nozzles being sharp-edged at their reduced outlet ends.

5. The combination set forth in claim 4, wherein the hollow member is composed of a plurality of concentric sleeves arranged one within the other, each sleeve being provided with a plurality of nozzles arranged side by side, the reduced outlet ends of the nozzles of one sleeve opening towards the enlarged inlet ends of the nozzles of the adjacent sleeve.

6. A dampening device adapted to be located in advance of the inlet of a combustion chamber, and comprising a conduit, and a plurality of nozzles arranged in said conduit in the path of a fluid charged thereby, said nozzles diminishing in cross-section in the direction of normal flow of such fluid and being sharp-edged at their reduced outlet ends.

HANS HOLZWARTH.